United States Patent [19]

Kawamura et al.

[11] Patent Number: 4,956,785
[45] Date of Patent: Sep. 11, 1990

[54] NUMERICAL CONTROL METHOD WITH A PARALLEL PROCESSING FUNCTION

[75] Inventors: Hideaki Kawamura, Hachiouji; Kentaro Fujibayashi, Mitaka; Yosato Hidaka, Hachioji, all of Japan

[73] Assignee: Fanuc Ltd., Minamitsuru, Japan

[21] Appl. No.: 243,298

[22] PCT Filed: Jan. 22, 1988

[86] PCT No.: PCT/JP88/00046

§ 371 Date: Jul. 11, 1988

§ 102(e) Date: Jul. 11, 1988

[87] PCT Pub. No.: WO88/05565

PCT Pub. Date: Jul. 28, 1988

[30] Foreign Application Priority Data

Jan. 23, 1987 [JP] Japan ................................. 62-12583

[51] Int. Cl.$^5$ .......................... F05B 19/403; F06F 9/22
[52] U.S. Cl. .................. 364/474.01; 364/133; 364/134; 364/131; 364/474.23; 364/474.11
[58] Field of Search ............... 364/131, 133, 134, 136, 364/140, 474.01–474.37, 200 MS File, 900 MS File

[56] References Cited

U.S. PATENT DOCUMENTS

| | | | |
|---|---|---|---|
| 4,068,297 | 1/1978 | Komiya ............................. | 364/200 |
| 4,298,927 | 11/1981 | Berslund et al. ................... | 364/200 |
| 4,484,286 | 11/1984 | Nagamine et al. ................. | 364/474.23 |
| 4,506,331 | 3/1985 | Kishi et al. ....................... | 364/474.29 |
| 4,534,001 | 8/1985 | Nozawa et al. ................... | 364/474.23 |
| 4,550,378 | 10/1985 | Nozawa et al. ................... | 364/474.21 |
| 4,591,968 | 5/1986 | Nozawa et al. ................... | 364/474.23 |
| 4,600,985 | 7/1986 | Nozawa et al. ................... | 364/180 |
| 4,680,697 | 7/1987 | Kiya et al. ........................ | 364/474.22 |
| 4,870,595 | 9/1989 | Otsuki .............................. | 364/474.23 |

OTHER PUBLICATIONS

Kai Hwang, "Concept of Pipeline Processing", 01.09.80, pp. 377–380.

Primary Examiner—Jerry Smith
Assistant Examiner—Jim Trammell
Attorney, Agent, or Firm—Staas & Halsey

[57] ABSTRACT

A numerical control method is provided, which is capable of uninterruptedly conducting control, at high speed, in accordance with various kinds of NC program. Command information stated in each of blocks of the NC program is read out and decoded by a first sub-CPU to prepare an intermediate data which is to be stored in a first shared RAM. This intermediate data is converted into data of execute form by a second sub-CPU and is stored in a second shared RAM. Preparatory processings for two blocks, each starting from the reading operation of the command information and ending at the preparation of the execute form data, are conducted simultaneously, so that a time period required for execution of each preparatory processing is shortened in apperance, to thereby prevent interruption of the numerical control due to a delay in the preparatory processing.

10 Claims, 2 Drawing Sheets

NUMERICAL CONTROL METHOD WITH A PARALLEL PROCESSING FUNCTION

FIELD OF THE INVENTION

The present invention relates to a numerical control (NC) method, which is capable of continuously performing control at high speed in accordance with various kinds of NC programs, without interruption.

DESCRIPTION OF THE RELATED ART

In general, a numerical control apparatus is arranged to read out, block by block, command information stated in an NC program, and to control operations of movable sections of a machine tool, on the basis of data obtained by converting the readout information into an execute form. The conversion to the execute form indicates a conversion where the command information read out from the NC program is converted into data of machine language which is easily processed in the numerical control apparatus.

According to a method where the above-mentioned conversion processing is executed each time command information of a block concerned is read out, i.e., where data reading and conversion processing (preparatory processing) for a block is started after completion of control operation associated with the preceding block, the operation of the movable section of the machine tool can be interrupted until the preparation of the execute form data for the first-mentioned block is completed. On this occasion, in an NC machine tool, for instance, there occur problems such as decreased machining efficiency, flawed workpieces, and vibration.

To obviate these problems, a conventional numerical control apparatus is provided with first and second buffers for storing the data converted into the execute form, and operates to effect parallel processing such that, for instance, while control processing associated with a certain block is carried out on the basis of the execute form data stored in the first buffer, different command information read out from the next block is converted into the execute form and then stored in the second buffer. Further, the control operation based on the data stored in the second buffer is started immediately after the control operation based on the data stored in the first buffer is completed, and at the same time, command information associated with the subsequent block is converted into execute form, to be stored in the first buffer.

The above-mentioned problems can be eliminated to some extent, by converting the command information associated with a certain block into execute form data, while control corresponding to the preceding block is executed, in the aforementioned manner. However, in case short blocks, requiring only a short time period for execution of the associated control operation, are continually stated, the control operation associated with the preceding block can be finished before the preparation of the execute form data for the succeeding block is completed. As a consequence, the operation of the movable section of thhe machine tool can be still interrupted between adjacent ones of these short blocks, resulting in occurrences of problems such as low machining efficiency.

SUMMARY OF THE INVENTION

The object of the present invention is to provide a numerical control method with a parallel processing function, which is capable of completing a preparatory processing for each block of an NC program before a control operation associated with a preceding block is finished, so as to prevent interruption of the control operation, to thereby make it possible to execute, in an uninterrupted manner and at high speed, control which is associated with various kinds of NC programs, including an NC program which contains continuous short blocks each requiring a short execution time.

In order to achieve the above-mentioned object, a numerical control method according to the present invention, comprises the steps of: (a) executing, by the use of a first information processing means, a first partial process of that preparatory processing in which an NC program is read out block by block and command information stated in the thus readout block is converted into an execute form; and (b) executing at least one different partial process which consists of the remaining process of said preparatory processing, by the use of at least one second information processing means which is equal in number to said at least one different partial process, each or the at least one second information processing means being arranged to receive an output data from a preceding information processing means, whereby preparatory processings for plural blocks are simultaneously executed.

In this manner, according to the present invention, since the preparatory processing for one block of an NC program is executed by a plurality of information processing means to thereby simultaneously effect the preparatory processings for plural blocks, the preparatory processing of command information to be used subsequently can be completed before a numerical control operation based upon command information stated in the preceding block is completed even when short blocks each requiring only a short execution time are continually stated. As a consequence, a movable section of a machine tool can be operated in an uninterrupted manner at a high speed even if the movable section of the machine tool is sequentially supplied with commands providing minute moving amounts in accordance with an NC program where short blocks each requiring short execution time are continually stated, so that the movable section is caused to carry out a complicated movement, for example, for machining a workpiece into a complicated shape.

DESCRIPTION OF THE PREFERRED EMBODIMENTS

Typically, a preparatory processing for reading out command information associated with one block from an NC program mainly includes the following partial processes.

(1) input data process for reading out command information of one block from the NC program, and for decoding the thus readout information;

(2) process for receiving command information of one block which has been subjected to the input data processing, and for preparing a unit of processing to conduct unit system processing and the like;

(3) process such as corner processing, chamfering processing;

(4) process, prior to off-set, for conducting linear conversion such as rotation of co-ordinate, scaling;

(5) cycle process such as fixed cycle, zero return cycle;

(6) tool diameter correction process;

(7) process, after off-set, such as co-ordinate system processing, tool length correction, tool position correction; and (8) output processing for outputting execute form data obtained by the processes (1) through (7).

In the following, an explanation will be given as to a numerical control method according to an embodiment of the present invention, wherein the above-mentioned various partial processes are divided into two groups, the first group comprising the first-mentioned input data process and the second group comprising the remaining processes (processes 2-8 above). The two groups of partial processes are respectively allocated to an executed by two central processing units (hereinafter referred to as CPUs).

Figure 1:
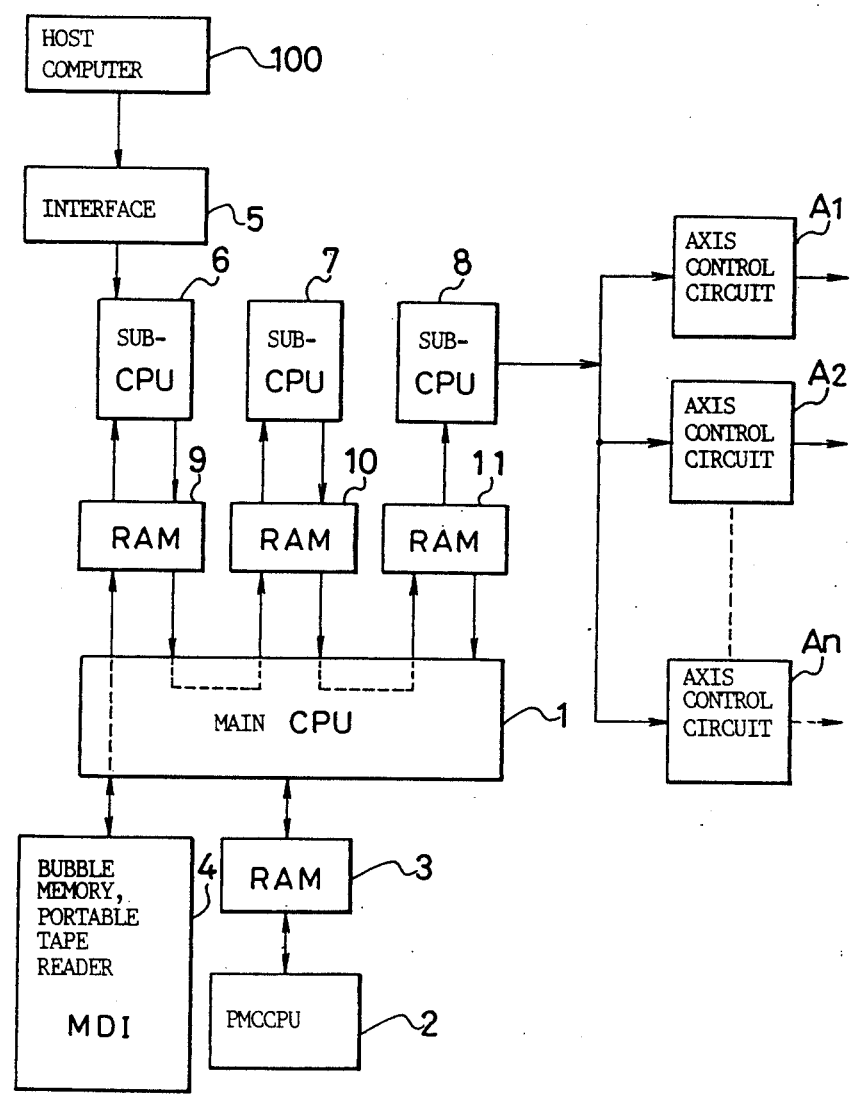
FIG. 1 is a block diagram of a numerical control apparatus to which a numerical control method according to an embodiment of the present invention is applied.

FIG. 1 shows a numerical control apparatus arranged to conduct processing according to the method of the present invention. Referrence numeral 1 denotes a main CPU for controlling the whole arrangement of the numerical control apparatus. Reference numeral 2 is a CPU for a programmable machine controller (not shown). Reference numeral 3 is a shared RAM and reference numeral 4 is a bubble memory, a portable tape reader, an MDI, ect., which are connected to the main CPU. In the meantime, an illustration of a ROM for storing a control program, etc., is omitted here. Further, reference numeral 5 denotes an interface for receiving an NC program supplied from a host computer 100, and for outputting the NC control program to a first sub-CPU 6 which is arranged to execute the first partial process of the preparatory processing, i.e., in this embodiment, the aforementioned input data process. Reference numeral 9 denotes a first shared RAM to which both of the main CPU 1 and the first sub-CPU 6 are accessible. In this arrangement, when the NC program is delivered from the host computer through the interface 5, intermediate data which has been subjected to the input data process by the first sub-CPU 6 is stored in the shared RAM 9. On the other hand, when the NC program is supplied from the bubble memory or the portable tape reader 4, the NC program is read out by the main CPU 1 and is stored in the first RAM 9, and is further subjected to the input data process by the first sub-CPU 6 to obtain intermediate data which is then stored in the RAM 9.

Reference numeral 7 denotes a second sub-CPU, and 10 denotes a second shared RAM to which both of the sub-CPU 7 and the main CPU 1 are accessible. This sub-CPU 7 reads out intermediate data, which has been read out from the first shared RAM 1 by the main CPU 1 and then delivered to the second shared RAM 10, and to prepare data of execute form which is to be written into the shared RAM 10. The thus stored execute form data in the second shared RAM 10 is delivered by the main CPU 1 to a third shared RAM 11. Furthermore, a third sub-CPU 8 is provided which performs pulse distribution processing for individual axes on the basis of the execute form data delivered into the shared RAM 11. Reference symbols A1 to An denote axis control circuits, respectively, for controlling servomotors (not shown) associated with individual axes of a machine tool (not shown) controlled by the numerical control apparatus.

Next, with reference to FIG. 2, the operation of the aformentioned numerical control apparatus will be explained.

Figure 2:
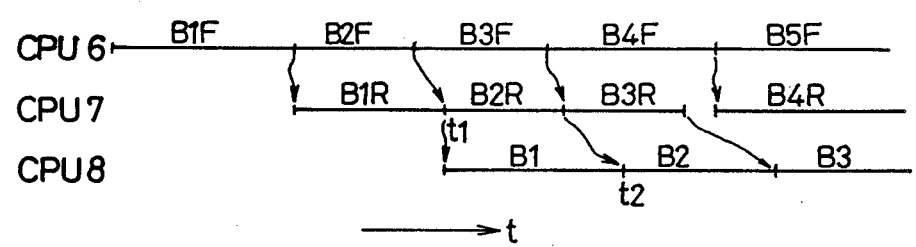
FIG. 2 is a timing chart showing operational timings of a central processing unit group shown in FIG. 1.

In FIG. 2, reference symbols Bi (i=1 to 5) represent the i-th block of the NC program, respectively, and suffixes F and R represent the input data process and the remaining process of the preparatory processing for each block concerned, respectively.

When the NC program is supplied through the interface 5, at first, the first sub-CPU 6 reads out the first block is conduct the first partial process, i.e., the input data process BIF of the preparatory process, and then writes the resultant intermediate data into the first shared RAM 9. During this time, the main CPU 1 monitors whether or not a condition is fulfilled, in which the intermediate data is permitted to be written into a first address region of the second shared RAM 10. If such a condition is fulfilled, the intermediate data is delivered from the first shared RAM 9 to the second shared RAM 10, to be stored in the latter. When the writing operation of the intermediate data into the second shared RAM 10 is completed, the second sub-CPU 7 starts the remaining partial process B1R of the preparatory processing other than the input data process, to prepare data of execute form which is then written into a second predetermined address region of the second shared RAM 10. At that time, the main CPU 1 monitors whether or not writing operation of this execute form data into a predetermined address region of the third shared RAM 11 is possible. When it is determined that such writing operation is possible, with the execute form data having been stored into the second shared RAM 10, the main CPU 1 reads out this execute form data and delivers the same to the third shared RAM 11 for storage. The third sub-CPU 8 reads out the execute form data from the third shared RAM 11, and starts the pulse distribution processing B1 for individual axes on the basis of the same data, to carry out pulse distribution to the axis control circuits A1 to An for the individual axes, so that the servomotors for these axes are driven for movement of one or more movable sections of the machine tool.

On the other hand, when the first sub-CPU 6 completes the input data process B1F for the first block B1, it executes the input data process B2F for the next block B2. In this manner, the first sub-CPU 6 starts the input data process for the next block concerned each time the input data process for the preceding block is completed. Also, the second sub-CPU 7 starts the remaining partial process of the preparatory processing for a next block each time the same partial process for the preceding block is completed. As a consequence, the preparatory processings for plural blocks are carried out in parallel or concurrently by the first and second sub-CPUs 6, 7.

Referring to FIG. 2, for instance, when the input process B1F for the first block B1 by the first sub-CPU 6 is completed the second sub-CPU 7 starts the remaining partial process B1R for the same block B1, and at the same time, the first sub-CPU 6 starts the input data process B2R for the second block B2. In this case, the preparatory processings for the first and second blocks B1, B2 are executed in a parallel manner. That is, prior to the point of time t1 at which the preparatory processing for the first block B1 is completed, the input data process for the next block B2 has been started, and, at the time point t1, the input data process B2F for the next block B2 has been completed (In a broader sense, at least most part of the input data processing has been already completed at that time). Typically, a required period of time t1 t2 from the instant at which the execute form data for the first block is output to the instant at which the execute form data for the next block is output, is shortened to about one-half of that of the case where the parallel preparatory processing for plural blocks according to this embodiment is not adopted.

As a consequence, there never occurs temporal termination in the operation of the movable section of the machine tool due to a delay in the preparation of execute form data for the succeeding block, and, in a broader sense, the possibility of occurrence of the operational interruption is greatly reduced.

If a delay in execution of the preparatory processing is found even when the same processing is divided into two parts and the preparatory processings for adjacent two blocks are executed in parallel, as in the aforementioned embodiment, the preparatory processing may be divided into three or more partial processes, and these partial processes may be conducted by individual information processing means such as, for instance, sub-CPUs, to thereby effect parallel preparatory processing for the three or more blocks. In this case, since a time period required for execution of the preparatory processing for each block is shortened in appearance, the aforementioned inconvenience can be eliminated.

Although, in the aforementioned embodiment, the intermediate data and the execute form data are delivered between the first and second shared RAMs 9, 10 and between the second and third shared RAMs 10, 11 through the main CPU 1 under the control of the last-mentioned CPU 1, the present invention is not limited thereto. For instance, a shared RAM to which the first and second sub-CPUs 6, 7 are accessible and another shared RAM to which the second and third sub-CPUs 7, 8 are accessible, may be employed together with these sub-CPUs, arranged to effect reading/writing operations of the intermediate data and execute form data, for transfer of these data, without the same data passing through the main CPU 1.

We claim:

1. A numerical control method for parallel processing of preparatory processing blocks including partial process steps, comprising the steps of:
   (a) reading, block by block, each preparatory processing block;
   (b) converting the read preparatory processing blocks into an execute form;
   (c) executing a first partial process step of a first preparatory processing block; and
   (d) executing a second partial proess step of said first preparatory processing block while executing a first partial process step of a second preparatory processing block.

2. A method according to claim 1, wherein immediately after said first partial process step for said first preparatory processing block is completed, execution of said first partial process step for said second preparatory processing block is started, and, immediately after said second partial process setp for said first preparatory processing block is completed, execution of said second partial process step for said second preparatory processing block is started.

3. A method as recited in claim 1, wherein a numerical control program includes the preparatory processing blocks,
   wherein said executing in step (c) includes the steps of:
      (c1) receiving the first preparatory processing block from the numerical control program; and
      (c2) input data processing of the first preparatory processing block to convert the first preparatory processing block into intermediate data, and
   wherein said executing in step (d) includes the steps of:
      (d1) receiving the intermediate data of the first preparatory processing block; and
      (d2) output data processing of the intermediate data to generate executable data.

4. A numerical control method for parallel processing first and second preparatory processing blocks of command data, comprising the steps of:
   (a) dividing each of said first and second preparatory processing blocks into first and second sub-steps;
   (b) executing the first sub-step of said first preparatory processing block; and
   (c) executing the second sub-step of said first preparatory processing block while simultaneously executing the first sub-step of said second preparatory processing block.

5. A method as recited in calim 4, wherein the second sub-step of said first preparatory processing step is executed immediately following the execution of the first sub-step of said first preparatory processing step.

6. A method as recited in claim 4, wherein the first sub-step of said second preparatory processing step is executed immediately following the execution of the first sub-step of said first preparatory processing step.

7. A method as recited in claim 4, wherein a numerical control program includes the preparatory processing blocks,
   wherein said executing in step (b) includes the steps of:
      (b1) receiving the first preparatory processing block from the numerical control program; and
      (b2) input data processing of the first preparatory processing block to convert the first preparatory processing block into intermediate data, and
   wherein said executing in step (c) incudes the steps of:
      (c1) receiving the intermediate data of the first preparatory processing block; and
      (c2) output data processing of the intermediate data to generate executable data.

8. An apparatus for performing parallel processing of a numerical control program having first and second preparatory processing steps, said apparatus comprising:
   dividing means for dividing each of the first and second preparatory processing steps into first and second sub-steps;
   first information processing means for executing said first sub-step of the first preparatory processing step; and
   second information processing means for executing said second sub-step of the first preparatory processing step while said first information processing means simultaneously executes said first sub-step of the second preparatory processing step.

9. An apparatus as recited in claim 8, wherein said second information processing means produces executable data, and wherein said apparatus further comprises third information processing means for executing the executable data to produce pulse distribution signals.

10. A numerical control apparatus, comprising:
a first processor for receiving a block of command data, executing a first partial process of a preparatory processing block, and for outputting intermediate data;
a first storage unit, operatively connected to said first processor, for storing the intermediate data;
a second processor, operatively connected to said first storage unit, for receiving the intermediate data from said first storage unit, executing a second partial process of the preparatory processing block concurrently with the executing of said first processor, and for outputting executable data,
a second storage unit, operatively connected to said second processor, for storing the executable data; and
a third processor, operatively connected to said second storage unit, for receiving the executable data from said second storage unit and for executing the executable data, concurrently with the executing of said second processor, to prduce pulse distribution signals.

* * * * *

UNITED STATES PATENT AND TRADEMARK OFFICE
CERTIFICATE OF CORRECTION

PATENT NO. : 4,956,785
DATED : September 11, 1990
INVENTOR(S) : Kawamura et al.

It is certified that error appears in the above-identified patent and that said Letters Patent is hereby corrected as shown below:

Col. 2, line 62, "processes." should be --processes;--;

Col. 5, line 65, "setp" should be --step--.

Col. 6, line 28, "calim" should be --claim--.

Signed and Sealed this

Thirty-first Day of December, 1991

Attest:

HARRY F. MANBECK, JR.

*Attesting Officer*  *Commissioner of Patents and Trademarks*